(12) United States Patent
Collina et al.

(10) Patent No.: US 9,068,029 B2
(45) Date of Patent: *Jun. 30, 2015

(54) PROCESS FOR THE PREPARATION OF IMPACT RESISTANT PROPYLENE POLYMER COMPOSITIONS

(75) Inventors: Gianni Collina, Cassana (IT); Marco Ciarafoni, Ferrara (IT); Ofelia Fusco, Ferrara (IT); Benedetta Gaddi, Ferrara (IT); Monica Galvan, S. Maria Maddalena (IT); Giampiero Morini, Ferrara (IT); Roberto Pantaleoni, Ferrara (IT); Joachim T. M. Pater, Cocomaro di Focomorto (IT); Fabrizio Piemontesi, Ferrara (IT); Francesca Verrocchio, Bologna (IT)

(73) Assignee: Basell Poliolefine Italia S.r.l., Milan (IT)

( * ) Notice: Subject to any disclaimer, the term of this patent is extended or adjusted under 35 U.S.C. 154(b) by 150 days.

This patent is subject to a terminal disclaimer.

(21) Appl. No.: 13/509,488

(22) PCT Filed: Nov. 15, 2010

(86) PCT No.: PCT/EP2010/067434
§ 371 (c)(1),
(2), (4) Date: May 22, 2012

(87) PCT Pub. No.: WO2011/061134
PCT Pub. Date: May 26, 2011

(65) Prior Publication Data
US 2012/0232221 A1 Sep. 13, 2012

Related U.S. Application Data

(60) Provisional application No. 61/283,263, filed on Dec. 1, 2009.

(30) Foreign Application Priority Data

Nov. 19, 2009 (EP) ..................................... 09176439

(51) Int. Cl.
*C08F 10/06* (2006.01)
*C08F 210/06* (2006.01)
*C08F 110/06* (2006.01)
*C08F 210/16* (2006.01)

(52) U.S. Cl.
CPC ............... *C08F 10/06* (2013.01); *C08F 110/06* (2013.01); *C08F 210/06* (2013.01); *C08F 210/16* (2013.01)

(58) Field of Classification Search
CPC ........ C08F 10/06; C08F 4/6492; C08F 4/651; C08F 2/001
See application file for complete search history.

(56) References Cited

U.S. PATENT DOCUMENTS

| 4,298,718 | A | | 11/1981 | Mayr et al. |
| 4,399,054 | A | * | 8/1983 | Ferraris et al. ................. 502/125 |
| 4,495,338 | A | | 1/1985 | Mayr et al. |
| 5,286,552 | A | * | 2/1994 | Lesca et al. .................... 428/220 |
| 2007/0010625 | A1 | * | 1/2007 | News et al. .................... 525/240 |
| 2007/0059545 | A1 | * | 3/2007 | Emiliani et al. ............... 428/515 |
| 2010/0261859 | A1 | * | 10/2010 | Vincenzi et al. ............ 526/125.4 |

FOREIGN PATENT DOCUMENTS

| EP | 0728769 | 8/1996 |
| WO | WO-0063261 | 10/2000 |
| WO | WO-2007147864 | 12/2007 |
| WO | WO-2007147865 | 12/2007 |
| WO | WO-2010146074 | 12/2010 |

* cited by examiner

*Primary Examiner* — Mark Kaucher

(57) ABSTRACT

A process for the preparation of propylene polymer compositions comprising from 50 to 90% by weight of a propylene polymer fraction insoluble in xylene at 25° C., and from 10 to 50% by weight of an ethylene copolymer fraction soluble in xylene at 25° C., said process being carried out in the presence of a specific catalyst system, is also characterized by the following step:

(i) contacting the catalyst components (a), (b) and optionally (c) for a period of time ranging from 0.1 to 120 minutes, at a temperature ranging from 0 to 90° C.;

(ii) polymerizing propylene in the optional presence of ethylene and/or $C_4$-$C_{10}$ alpha olefins producing a propylene (co)polymer being for at least 85% by weight of insoluble in xylene at 25° C. and (iii) in a successive step, carried out in gas-phase, in the presence of the product coming from (ii), polymerizing mixtures of ethylene with α-olefins $CH_2$=CHR in which R is a hydrocarbon radical having 1-10 carbon atoms, to produce an ethylene copolymer. An increased reactivity in the last step is observed.

14 Claims, No Drawings

PROCESS FOR THE PREPARATION OF IMPACT RESISTANT PROPYLENE POLYMER COMPOSITIONS

This application is the U.S. national phase of International Application PCT/EP2010/067434, filed Nov. 15, 2010, claiming priority to European Application 09176439.9 filed Nov. 19, 2009, and the benefit under 35 U.S.C. 119(e) of U.S. Provisional Application No. 61/283,263, filed Dec. 1, 2009; the disclosures of International Application PCT/EP2010/067434, European Application 09176439.9 and U.S. Provisional Application No. 61/283,263, each as filed, are incorporated herein by reference.

The present invention relates to a polymerization process for the preparation of impact resistant propylene polymer compositions. The compositions obtained with this process are characterized by an excellent impact resistance/rigidity balance.

Impact resistant propylene polymer compositions are very well known in the art. Typically, they comprise a relatively high crystallinity propylene polymer fraction insoluble in xylene at 25° C., and a relatively low crystallinity copolymer fraction being soluble in xylene at 25° C. The relatively high crystallinity fraction is generally a propylene homopolymer, or a random propylene copolymer with a relatively low amount of olefin comonomer, characterized by high isotacticity. The relatively low crystallinity fraction is generally a propylene copolymer and particularly a propylene-ethylene copolymer having a content of ethylene ranging from 15 to 75% wt. The said compositions can be prepared by several methods, including the mechanical blend of the two components. The preferred method however, is the in-reactor preparation by a sequence of polymerization step carried out in one or two reactor. Usually, in the first step propylene is copolymerized or copolymerized with a small amount of other olefins in order to produce the high crystallinity fraction, while in a second step carried out under different polymerization conditions and in particular in a reaction mixture comprising a higher amount of olefin comonomer, the low fraction, which is usually very soluble in xylene, is produced.

This method is largely used industrially and it is preferably carried out operating in two different reactors which can operate according to the same or different polymerization technology. In particular, the first stage can be carried out in a liquid phase reactor or in gas-phase reactor, while the second step is commonly carried out in gas-phase in order to avoid the dissolution of the low crystallinity fraction in the reaction bath.

In this type of process the performance of the catalyst is very important. The catalyst system in fact should be able to produce a very isotactic propylene (co)polymer in the first step, while in the second should be able to produce a copolymer in which the olefin comonomer units are sufficiently distributed along and among the polymer chains in order to have a copolymer with a low crystallinity, i.e., high solubility in xylene which confers impact resistance to the composition. Of course, the catalyst is also requested to provide a high polymerization activity in order to maintain at an acceptable level the plant productivity. Due to the presence of multiple polymerization steps and to the fact that a certain weight balance among the two polymer fractions must be kept, the catalyst needs to maintain an acceptable level of polymerization activity over the time and in particular should be able to maintain the necessary level of reactivity in gas-phase. This latter is a key feature as the reactivity in gas-phase is related to the amount of low crystallinity copolymer which, in turn, is related to the amount of crystalline polymer matrix for a given balance of properties. If the reactivity in gas phase is too low, also the productivity of first polymerization stage should be depressed in order to get the compositional target. Accordingly, it would be important to have available a catalyst showing an improved gas-phase reactivity.

Moreover, due to the presence of polymerization stages under different conditions, the behavior of a catalyst and in particular of a mixture of catalysts is hardly predictable. In fact, each catalyst may have a different behavior in respect of certain polymerization conditions and the specific results would need to be checked. A catalyst, or mixture of catalysts, may for example have an excellent activity but poor properties in terms of xylene soluble polymer material incorporation. Accordingly, documents that only very generically disclose suitability of a catalyst or mixture of catalysts for preparation of impact propylene copolymers do not actually convey any concrete teaching in the absence of a working example. This is the case for example of WO2007/147864 and WO2007/147865. The first document suggests using a blend of two Ziegler-Natta catalysts containing a succinate and a diether respectively. The second document teaches to use a catalyst containing a blend of the two donors. In both cases the object is to obtain a propylene polymer having characteristics affected from both succinate and diether donors. Said documents mention very generally, without any concrete example, that the proposed solution could be suitable for production of propylene heterophasic copolymers. However, said documents do not address the issue of the catalyst reactivity in gas phase and therefore do not give any concrete indication regarding how to select the specific catalyst component and how to use it in order to meet this target.

It is therefore an object of the present invention a process for the preparation of propylene polymer compositions carried out in the presence of a catalyst system comprising the product obtained by contacting (a) a solid catalyst component having average particle size ranging from 15 to 80 μm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3 diethers, (b) an aluminum hydrocarbyl compound in which the hydrocarbyl is selected from $C_3$-$C_{10}$ branched aliphatic or aromatic radicals and optionally (c) an external electron donor compound, and comprising the following steps:

(i) contacting the catalyst components (a), (b) and optionally (c) for a period of time ranging from 0.1 to 120 minutes, at a temperature ranging from 0 to 90° C.;

(ii) polymerizing propylene in the optional presence of ethylene and/or $C_4$-$C_{10}$ alpha olefins producing a propylene (co)polymer being for at least 85% by weight of insoluble in xylene at 25° C. and (iii) in a successive step, carried out in gas-phase, in the presence of the product coming from (ii), polymerizing mixtures of ethylene with α-olefins $CH_2$=CHR in which R is a hydrocarbon radical having 1-10 carbon atoms, to produce an ethylene copolymer.

Preferably, the succinate present in the solid catalyst component (a) is selected from succinates of formula (I) below

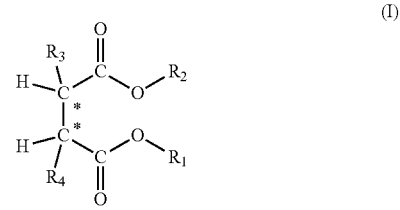

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S)

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl. Examples of the above-mentioned compounds are the (S,R) (S,R) forms pure or in mixture, optionally in racemic form, of diethyl 2,3-bis(trimethylsilyl) succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (Ia)

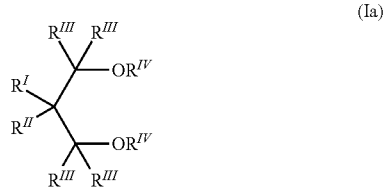

(Ia)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

Furthermore, particularly preferred are the 1,3-diethers of formula (II)

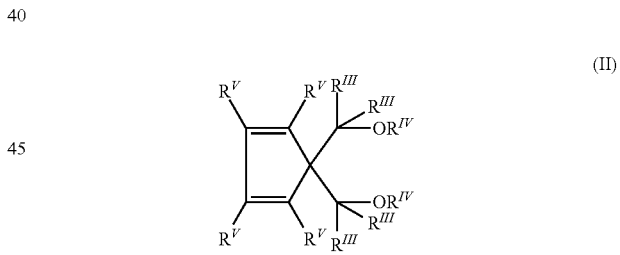

(II)

where the radicals $R^{IV}$ have the same meaning explained above and the radicals $R^{III}$ and $R^V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

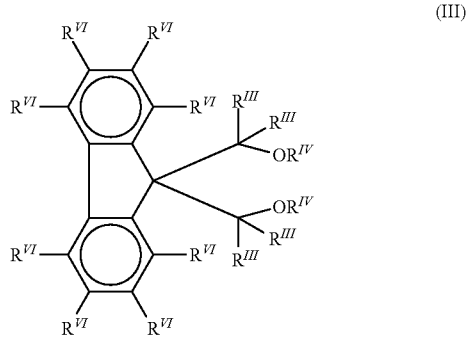

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n–1 X is halogen and R is a hydrocarbon radical having from 1 to 10 carbon atoms.

Preferably, the catalyst component (a) has an average particle size ranging from 20 to 70 μm and more preferably from 25 to 65 μm. As explained the succinate is present in an amount ranging from 50 to 90% by weight with respect to the total amount of donors. Preferably it ranges from 60 to 85% by weight and more preferably from 65 to 80% by weight. The 1,3-diether preferably constitutes the remaining amount.

The aluminum hydrocarbyl compound (b) is preferably chosen among those in which the branched radical is an aliphatic one and more preferably from branched trialkyl aluminum compounds selected from triisopropylaluminum, tri-iso-butylaluminum, tri-iso-hexylaluminum, tri-iso-octylaluminum. It is also possible to use mixtures of branched trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1trifluoropropyl-2-ethylpiperidinyl-dimethoxysilane and 1,1,1trifluoropropyl-metil-dimethoxysilane. The external electron donor compound is used in such an amount to give a molar ratio between the organo-aluminum compound and said electron donor compound of from 5 to 500, preferably from 5 to 400 and more preferably from 10 to 200.

In step (i) the catalyst forming components are contacted with a liquid inert hydrocarbon solvent such as, e.g., propane, n-hexane or n-heptane, at a temperature below about 60° C. and preferably from about 0 to 30° C. for a time period of from about six seconds to 60 minutes.

The above catalyst components (a), (b) and optionally (c) are fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. Preferably, the said components are pre-contacted at a temperature of from 10 to 20° C. for 1-30 minutes. The precontact vessel can be either a stirred tank or a loop reactor.

Preferably, the precontacted catalyst is then fed to the pre-polymerization reactor where a prepolymerization step (i)a takes place. The prepolymerization step is carried out in a first reactor selected from a loop reactor or a continuously stirred tank reactor. The prepolymerization can be carried out either in gas-phase or in liquid-phase. Preferably it is carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i)a is carried out in the absence of inert hydrocarbon solvents.

The average residence time in this reactor generally ranges from 2 to 40 minutes, preferably from 10 to 25 minutes. The temperature ranges between 10° C. and 50° C., preferably between 20° C. and 40° C. Adopting these conditions allows to obtain a pre-polymerization degree in the preferred range from 60 to 800 g per gram of solid catalyst component, preferably from 150 to 500 g per gram of solid catalyst component. Step (i)a is further characterized by a low concentration of solid in the slurry, typically in the range from 50 g to 300 g of solid per liter of slurry.

The slurry containing the catalyst preferably pre-polymerized is discharged from the pre-polymerization reactor and fed to the reactor where step (ii) takes place. Step (ii) can be carried out either in gas-phase or in liquid phase. The gas-phase process can be carried out in a fluidized or stirred, fixed bed reactor or in a gas-phase reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the step (i) is carried out by polymerizing in liquid monomer, preferably in loop reactor, propylene, optionally in mixture with ethylene and/or $C_4$-$C_{10}$ alpha olefins, to give the propylene polymer of the required xylene insolubility.

In this stage and/or in the successive stage, hydrogen can be used as a molecular weight regulator. The propylene polymer obtained in this stage has a xylene insolubility preferably higher than 90% and more preferably higher than 95%, an isotactic index in terms of content of isotactic pentads (determined with C13-NMR on whole polymer (ii) higher than 93%, preferably higher than 95%, and more preferably higher than 97%. The Melt Flow Rate value according to ISO 1133 (230° C., 2.16 Kg) can vary within a wide range going from 0.01 to 300 g/10 min and particularly from 0.1 to 250 g/10 min.

In the subsequent stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The polymer produced in (iii) is preferably an ethylene copolymer containing from 15 to 75% wt of a C3-C10 alpha olefin, optionally containing minor proportions of a diene, being for at least 60% soluble in xylene at room temperature. Preferably the alpha olefin is selected from propylene or butene-1 and its content ranges preferably from 20 to 70% wt.

The final polymer composition obtained through the process of the invention preferably comprises 30-90 parts by weight, preferably 40-80 parts by weight of (A) a propylene polymer optionally containing minor amounts of ethylene and/or $C_4$-$C_{10}$ alpha olefins being insoluble in xylene at 25° C. and 10-70 preferably 20-60 parts by weight of (B) an ethylene copolymer soluble in xylene preferably containing from 20 to 70% of C3-C10 alpha olefin. The said propylene polymer compositions having a ratio between the intrinsic viscosities of the polymer produced in (ii) and that of the polymer produced in (iii) in tetrahydronaphthalene at 135° C. of the portion soluble in xylene and of the portion insoluble in xylene at room temperature of from 0.3 to 5.

The total ethylene content is higher than 9%, preferably higher than 10% and more preferably ranging from 10 to 50% by weight.

The value of the intrinsic viscosity of the xylene soluble fraction determined on the reactor grade polymer composition ranges from 0.5 dl/g to 6.0 dl/g, preferably between from 1.0 to 4.0 dl/g and more preferably from 2.0 to 4.0 dl/g.

The compositions obtained according to the process of the invention can be obtained as reactor grade with a Melt Flow Rate value according to ISO 1133 (230° C., 2.16 Kg) ranging from 0.01 to 100 g/10 min, preferably from 0.1 to 70 and more preferably from 0.2 to 60 g/10 min. If desired they can be visbroken according to known technique in order to reach the final MFR value suited for the selected application. The chemical degradation of the polymer (visbreaking) is carried out in the presence of free radical initiators, such as peroxides. Examples of radical initiators that can be used for this purpose are 2,5-dimethyl-2,5-di(tert-butylperoxide)-hexane and dicumyl-peroxide. The degradation treatment is carried out by using the appropriate quantities of free radical initiators, and preferably takes place in an inert atmosphere, such as nitrogen. Methods, apparatus, and operating conditions known in the art can be used to carry out this process.

The so obtained propylene copolymers are characterized by an excellent balance among impact resistance and stiffness. The flexural modulus, determined according to ISO 178, is higher than 900 Mpa, preferably higher than 1200 Mpa and more preferably higher than 1400 MPa. The impact strength of the composition tested at 0° C. ranges from 1 to 30 KJ/m$^2$ while at −20° C. it is comprised from 5 to 10 KJ/m$^2$ Other preferred features of the composition obtained by the process of the invention are:
  a molecular weight distribution in component (A), expressed by the $\overline{M}w/\overline{M}n$ ratio, measured by GPC, equal to or higher than 5, typically 6-10;

a value of $\overline{Mz}/\overline{Mw}$ ratio in component (A), measured by GPC, equal to or higher than 2.5, in particular from 2.5 to 4.5, typically 3-4.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetic stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid are poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Comonomer (C2) Content

By IR spectroscopy.

The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.
b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$ is used for both heterophasic and/or random copolymers The comonomer content of the Component B is determined on the precipitated "amorphous" fraction of the polymer. The precipitated "amorphous" fraction is obtained as follows: to one 100 ml aliquot of the filtered liquid obtained as described above 200 ml of acetone are added under vigorous stirring. Precipitation must be complete as evidenced by a clear solid-solution separation. The solid thus obtained is filtered on a metallic screen and dried in a vacuum oven at 70° C. until a constant weight is reached.

Molar Ratio of Feed Gas
 Determined by gas-chromatography
Melt Flow Rate (MFR)
 Determined according to ISO 1133 (230° C., 2.16 Kg)
Intrinsic Viscosity
 Determined in tetrahydronaphthalene at 135° C.
Flexural Modulus
 Determined according to ISO 178
Stress at Yield and at Break
 Determined according to ISO 527
Elongation at Yield and Break
 Determined according to ISO 527
IZOD Impact Strength
 Determined according to ISO 180/1A
Melting Temperature, Melting Enthalpy and Crystallization Temperature
 Determined by DSC with a temperature variation of 20° C. per minute Examples 1 and Comparative Example 1

Example 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2 \cdot 2.1C_2H_5OH$ having average particle size of 47 μm (prepared in accordance with the method described in example 1 of EP728769, an amount of diethyl 2,3-diisopropylsuccinate in racemic form such as to have a Mg/succinate molar ratio of 12 was added. The temperature was raised to 100° C. and kept at this value for 60 min. After that the stirring was stopped, the liquid siphoned off and the treatment with TiCl4 was repeated at 110° C. for 30 min. After siphoning, fresh $TiCl_4$ and an amount of 9,9-bis(methoxymethyl)fluorene such as to have a Mg/succinate molar ratio of 12 were added. Then the temperature was raised to 90° C. for 30 min. After sedimentation and siphoning at 85° C. the solid was washed six times with anhydrous hexane (6×100 ml) at 60° C.

Catalyst System and Prepolymerization Treatment

Before introducing it into the polymerization reactors, the solid catalyst component described above is contacted with aluminum triisobutyl (Tibal) and dicyclopentyldimethoxysilane (DCPMS) at a temperature of 15° C. under the conditions reported in Table 1. In comparison example 1 TEAL was used instead of TIBAL.

The catalyst system is then subject to prepolymerization at 20° C. by maintaining it in suspension in liquid propylene before introducing it into the first polymerization reactor.

Polymerization

The polymerization run is carried out in continuous mode in a series of two reactors equipped with devices to transfer the product from one reactor to the one immediately next to it. The first reactor is a liquid phase loop reactor, and the second is a fluidized bed gas-phase reactor. A propylene homopolymer is prepared in the liquid loop reactor while an ethylene copolymer is prepared in the gas-phase reactor in the presence of the propylene homopolymer coming from the first stage. Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced in the three reactors are reported in Table 1.

Comparison Example 1

The polymerization was carried out with the same catalyst and under the conditions described for example 1 with the differences that triethyl aluminum (TEAL) was used was used instead of TIBAL.

TABLE 1

| PROCESS CONDITIONS | Example 1 | Comp. 1 |
|---|---|---|
| Precontact | | |
| Residence time (min) | 19 | 20 |
| Tibal/donor ratio | 8 | 10 (Teal) |
| T (° C.) | 15 | 15 |
| Loop 1$^{st}$ reactor in liquid phase - propylene homopolymer | | |
| Temperature, ° C. | 70 | 70 |
| Pressure, bar | 40 | 40 |
| Residence time, min | 58 | 65 |
| H$_2$ feed mol ppm | 4100 | 4000 |
| Split, wt % | 83 | 81 |
| Gas-Phase reactor C2$^-$/C3$^-$ polymerization | | |
| Temperature, ° C. | 80 | 80 |
| Pressure, bar | 15 | 15 |
| Residence time, min | 13 | 25 |
| C$_2^-$/C$_2^-$ + C$_3^-$, % | 0.33 | 0.29 |
| H$_2$/C$_2^-$, % | 0.07 | 0.08 |
| Split, wt % | 17 | 19 |
| % C2 in copolymer | 44 | 41 |
| Activity Ratio (Kg/g) | 1.01 | 0.59 |
| Bulk density g/cc | 0.45 | 0.46 |
| Polymer properties | | |
| MFR (g/10') | 40 | 46 |
| Xylene solubles (%) | 16.1 | 17.9 |
| XSIV (dl)/g | 2.43 | 2.37 |
| Flex Mod (Mpa) | 1518 | 1466 |
| Izod at 23° C. (KJ/m$^2$) | 4.8 | 4.8 |
| Izod at 0° C. (KJ/m$^2$) | 4.2 | 4.6 |
| Izod at −20° C. (KJ/m$^2$) | 3.0 | 3.8 |
| Tens. Strength at yield (Mpa) | 27.3 | 26.3 |

Notes:
H$_2$ bulk = hydrogen concentration in the liquid monomer;
C$_2^-$ = ethylene;
C$_3^-$ = propylene;
Split = amount of polymer prepared in the concerned reactor, referred to the total weight.

The invention claimed is:

1. A process for the preparation of propylene polymer compositions carried out in the presence of a catalyst system comprising the product obtained by contacting:
    (a) a solid catalyst component having an average particle size ranging from 15 to 80 μm comprising a magnesium halide, a titanium compound having at least a Ti-halogen bond and at least two internal electron donor compounds, wherein one of the electron donor compounds is present in an amount from 50 to 90% by mol with respect to the total amount of donors and selected from succinates and another electron donor compound is selected from 1,3 diethers,
    (b) an aluminum hydrocarbyl compound wherein the hydrocarbyl is selected from C$_3$-C$_{10}$ branched aliphatic or aromatic radicals and optionally
    (c) an external electron donor compound, the process comprising the following steps:
        (i) contacting the catalyst components (a), (b) and optionally (c) for a period of time ranging from 0.1 to 120 minutes, at a temperature ranging from 0 to 90° C.;
        (ii) polymerizing propylene in the optional presence of at least one of ethylene and C$_4$-C$_{10}$ alpha olefins, thereby producing a propylene (co)polymer being at least 85% by weight insoluble in xylene at 25° C.; and
        (iii) in a successive step carried out in gas-phase, in the presence of the product coming from (ii), polymerizing mixtures of ethylene with α-olefins CH$_2$=CHR wherein R is a hydrocarbon radical having 1-10 carbon atoms, thereby producing an ethylene copolymer wherein the propylene polymer composition has a ratio between the intrinsic viscosities of the propylene (co) polymer and that of the ethylene copolymer in tetrahydronaphthalene at 135° C. of the portion soluble in xylene and of the portion insoluble in xylene at room temperature from 0.3 to 5 and
    wherein the propylene polymer composition has an impact strength at determined according to ISO 180/1A at −20° C. from 5 to 10 KJ/m$^2$.

2. The process according to claim 1 wherein the succinate present in the solid catalyst component (a) is selected from succinates of formula (I):

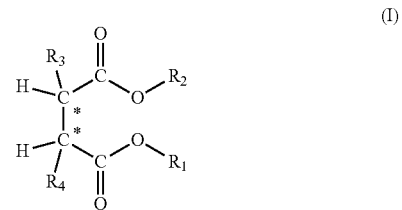

(I)

wherein the radicals R$_1$ and R$_2$, equal to, or different from, each other are a C$_1$-C$_{20}$ linear or branched alkyl, alkenyl, cycloalkyl, aryl, arylalkyl or alkylaryl group, optionally containing heteroatoms; and the radicals R$_3$ and R$_4$ equal to, or different from, each other, are C$_1$-C$_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

3. The process according to claim 1 wherein the 1,3-diethers belong to formula (Ia):

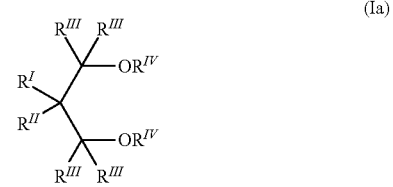

(Ia)

where R$^I$ and R$^{II}$ are the same or different and are hydrogen or linear or branched C$_1$-C$_{18}$ hydrocarbon groups which can also form one or more cyclic structures; R$^{III}$ groups, equal or different from each other, are hydrogen or C$_1$-C$_{18}$ hydrocarbon groups; and R$^{IV}$ groups equal or different from each other, have the same meaning of R$^{III}$ except that they cannot be hydrogen; and each of the $R^I$ to $R^{IV}$ groups can contain heteroatoms selected from halogens, N, O, S and Si.

4. The process according to claim 1 wherein the catalyst component (a) comprises a titanium compound having at least a Ti-halogen bond and a Mg halide.

5. The process according to claim 1 wherein the catalyst component (a) has an average particle size ranging from 20 to 70 μm.

6. The process according to claim 1 wherein the succinate is present in an amount ranging from 50 to 90% by weight with respect to the total amount of donors and the 1,3-diether constitutes the remaining amount with respect to the total amount of donors.

7. The process according to claim 1 wherein the aluminum alkyl compound is selected from triisopropylaluminum, tri-iso-butylaluminum, tri-iso-hexylaluminum, or tri-iso-octyla-luminum.

8. The process of claim 7 wherein the aluminum alkyl compound is triisobutylaluminum.

9. The process according to claim 1 wherein in step (i) the catalyst forming components are contacted with a liquid inert hydrocarbon solvent at a temperature below about 60° C. and for a time period of from about six seconds to 60 minutes.

10. The process according to claim 1 wherein in step (i) the catalyst components (a), (b) and optionally (c) are fed to a pre-contacting vessel, in amounts such that the weight ratio (b)/(a) is in the range of 0.1-10 and if the compound (c) is present, the weight ratio (b)/(c) ranges from 10 to 200.

11. The process according to claim 1 wherein the precontacted catalyst is then fed to a prepolymerization reactor where a prepolymerization step (i)a takes place.

12. The process according to claim 11 wherein the catalyst is prepolymerized to a pre-polymerization degree ranging from 60 to 800 g per gram of solid catalyst component.

13. The process according to claim 1 wherein step (ii) is carried out in liquid monomer.

14. The process of claim 1 wherein the final polymer compositions comprise 30-90 parts by weight, of (A) a propylene polymer, optionally containing minor amounts of at least one of ethylene and $C_4$-$C_{10}$ alpha olefins, insoluble in xylene at 25° C. and 10-70 parts by weight of (B) an ethylene copolymer soluble in xylene at 25° C. containing from 20 to 70% of C3-C10 alpha olefin.

\* \* \* \* \*